United States Patent

(12) United States Patent
Hara

(10) Patent No.: US 7,920,273 B2
(45) Date of Patent: Apr. 5, 2011

(54) METHOD FOR ESTIMATING DISTANCE BETWEEN TRACKING TYPE LASER INTERFEROMETER AND TARGET, AND TRACKING TYPE LASER INTERFEROMETER

(75) Inventor: Shinichi Hara, Tsukuba (JP)

(73) Assignee: Mitutoyo Corporation, Kawasaki-shi (JP)

( * ) Notice: Subject to any disclaimer, the term of this patent is extended or adjusted under 35 U.S.C. 154(b) by 234 days.

(21) Appl. No.: 12/379,467

(22) Filed: Feb. 23, 2009

(65) Prior Publication Data
US 2009/0237674 A1    Sep. 24, 2009

(30) Foreign Application Priority Data
Mar. 19, 2008 (JP) ................................ 2008-070942

(51) Int. Cl.
*G01B 11/02* (2006.01)
(52) U.S. Cl. ........................................................ 356/498
(58) Field of Classification Search ................ 356/4.09, 356/498
See application file for complete search history.

(56) References Cited

U.S. PATENT DOCUMENTS

| 4,707,129 A * | 11/1987 | Hashimoto et al. .......... 356/4.09 |
| 5,903,459 A | 5/1999 | Greenwood et al. |
| 2007/0024861 A1 | 2/2007 | Yanaka et al. |
| 2007/0268494 A1 | 11/2007 | Hara et al. |

FOREIGN PATENT DOCUMENTS

| EP | 1 041 357 A1 | 10/2000 |
| EP | 1 225 422 A1 | 7/2002 |
| JP | A-63-231286 | 9/1988 |
| JP | A-2007-057522 | 3/2007 |
| JP | A-2007-309677 | 11/2007 |

* cited by examiner

*Primary Examiner* — Tarifur Chowdhury
*Assistant Examiner* — Jonathon D Cook
(74) *Attorney, Agent, or Firm* — Oliff & Berridge, PLC

(57) ABSTRACT

In the tracking type laser interferometer including: a laser interferometer; an optical axis deviation detection sensor for detecting a deviation of an optical axis of the laser interferometer; a two-axis turning mechanism for turning the laser interferometer to any optional direction; an angle sensor for detecting a turning angle of the two-axis turning mechanism; a retroreflector for reflecting its reflected light to a direction parallel to the incident light; and a controller for driving the two-axis turning mechanism so as to track the retroreflector based on signals of the optical axis deviation detection sensor and the angle sensor, stop of the retroreflector is detected, and a target distance is calculated from the turning center of the laser interferometer to the center of the retroreflector based on the total sum of deviation of an optical axis during movement, which is obtained by the optical axis deviation detection sensor, and a turning angle during movement, which is obtained by the angle sensor.

12 Claims, 6 Drawing Sheets

METHOD FOR ESTIMATING DISTANCE BETWEEN TRACKING TYPE LASER INTERFEROMETER AND TARGET, AND TRACKING TYPE LASER INTERFEROMETER

CROSS-REFERENCE TO RELATED APPLICATION

The disclosure of Japanese Patent Application No. 2008-70942 filed on Mar. 19, 2008 including specifications, drawings and claims is incorporated herein by reference in its entirety.

BACKGROUND OF THE INVENTION

1. Field of the Invention

The present invention relates to a method for estimating the distance between a tracking type laser interferometer and a target, and a tracking type laser interferometer, and in particular, to a method for estimating the distance between a tracking type laser interferometer, which is capable of accurately estimating the absolute distance during measurement even in a case where the detection range of a sensor for detecting a deviation of an optical axis is narrow, and a tracking type laser interferometer adopting the estimation method.

2. Description of the Related Art

Such a tracking type laser interferometer has been known which is composed of a laser interferometer incorporating an optical axis deviation detection sensor for detecting the deviation of an optical axis of return light, a two-axis turning mechanism for turning the laser interferometer to any optional direction, and a retroreflector, which is fixed at an object to be measured (Japanese Published Unexamined Patent Application No. S63-231286, hereinafter called Patent Document 1, and Japanese Published Unexamined Patent Application No. 2007-57522, hereinafter called Patent Document 2). Here, the retroreflector is an optical element, in which incident light and reflected light become parallel to each other, and it is possible to execute interferometric length measurement in any optional direction by controlling the two-axis turning mechanism based on the output of an optical axis deviation detector sensor so that the deviation of the optical axis becomes zero (0).

A general tracking type laser interferometer is composed to include, as shown in FIG. 1, a measurement head 103 having a laser interferometer (hereinafter merely also called an interferometer) 101 and an optical axis deviation detection sensor 102 for detecting a deviation in the optical axis of measurement light and reflected light, a two-axis turning mechanism 104 for turning the measurement head 103 to any optional direction, an angle sensor 105 for detecting a turning angle of the two-axis turning mechanism 104, a retroreflector 107 fixed on an object 106 to be measured, and a controller 108 for tracking the object 106 to be measured and collecting measurement data.

The controller 108 collects a distance signal from the interferometer 101, a deviation of an optical axis from the optical axis deviation sensor 102, and an angular signal from the two-axis turning mechanism 104, and drives the two-axis turning mechanism 104 so that the deviation of an optical axis becomes zero (0).

Distance measurement using the tracking type laser interferometer is carried out as follows. FIG. 2 shows one example of the positional relationship among the optical axis of the laser interferometer 101, turning center O of the interferometer 101, and center P of the retroreflector 107 during tracking control. Here, for simplification, only one axis, turning in the horizontal direction, of the two-axis turning mechanism 104 is taken into consideration.

It is assumed that the turning angle in the horizontal direction is $\theta_t$, where the optical axis of the tracking type laser interferometer is expressed in a spherical coordinate system, and the turning angle in the horizontal direction is $\theta_r$, where the center of the retroreflector 107 is made into P, and the position P is expressed in the spherical coordinate system.

FIG. 3 shows one example of positional relationship between the measurement light of the laser interferometer 101 and points O and P when the tracking type laser interferometer is tracking the retroreflector 107. If the direction of measurement light to the center P of the retroreflector 107 positioned at distance L from the point O in the direction $\theta_r$ is $\theta_t$, the following expression can be established between the axial gap $\Delta\theta_d$ for angles $\theta_r$ and $\theta_d$ (direction of the center P of the retroreflector 107), deviation d of the optical axis, and distance (target distance) L between the points O and P.

$$d=2L\sin(\theta_r-\theta_t)=2L\sin\Delta\theta_2 \quad (1)$$

If the angular deviation $\Delta\theta_d$ is obtained by transforming the expression, the following expression can be brought about.

$$\Delta\theta_d=(\theta_r-\theta_t)=\sin^{-1}(d/2L) \quad (2)$$

FIG. 4 is a block diagram of a general angular control system. Angular deviation $\Delta\theta_d$ is taken from the target value $\theta_r$ and the present value $\theta_t$ detected by an angular sensor 403, and is multiplied by an angular compensation element 401 to obtain an angular velocity instruction value $\omega$. The angular velocity instruction value $\omega$ is input in an object 402 to be controlled.

In the tracking type laser interferometer, the two-axis turning mechanism 104 is controlled by adopting a feedback control system that uses $\omega_r$, which expresses the movement amount of the retroreflector 107 in the spherical coordinate system, as an instruction value, and uses an angle $\theta_t$ obtained by the angle sensor 105 incorporated in the two-axis turning mechanism 104 as a feed back signal. However, since in actuality, there is no method to observe $\theta_r$, as shown in FIG. 5 using the conversion element 503 that converts the deviation d of an optical axis and distance L to the angular deviation $\Delta\theta_d$, the two-axis turning mechanism 104 is controlled based on $\Delta\theta_d$, which is obtained based on L and d in the expression (2), as the angular deviation.

As described above, it becomes necessary to obtain the distance L between the turning center O of interferometer and the center P of the retroreflector in the tracking control system. However, since the interferometer 101 measures a relative distance, the absolute distance L cannot be obtained. Since the resolution of millimetric order is sufficient for the distance L calculated in the tracking control, another method for estimating the distance L is prepared separately from the interferometer 101.

As the method for estimating the distance L between the turning center O of interferometer and the center P of the retroreflector, a method for using an absolute distance sensor and a method for measuring the distance of a point, which is already known, and obtaining the distance L using the distance from the point may be considered. However, the former one causes an increase in the entire system, and the latter one causes a decrease in the throughput for measurement.

In order to solve such problems, the applicant has proposed in Japanese Published Unexamined Patent Application No. 2007-309677 (hereinafter called Patent Document 3) that the distance is obtained based on an angular width corresponding to the width of a detection range by scanning an optical axis in the detection range of a light spot position detection element secured in the optical axis deviation detection sensor 102 using the angle sensor 105 incorporated in the drive mechanism.

According to the method proposed by Patent Document 3, although it is possible to estimate the absolute distance at an optional position, there is a problem that the narrower the detection range of the optical axis deviation detection sensor is, the greater the errors become.

SUMMARY OF THE INVENTION

The present invention was developed to solve the problems in the prior arts, and it is therefore an object thereof to enable estimation of an accurate absolute distance during measurement without interrupting measurement for distance measurement even in a case where a small-sized sensor for detecting a deviation of an optical axis is used and the detection range is narrow.

The present invention provides a tracking type laser interferometer including a laser interferometer, an optical axis deviation detection sensor for detecting a deviation of an optical axis of the laser interferometer, a two-axis turning mechanism for turning the laser interferometer to any optional direction, an angle sensor for detecting a turning angle of the two-axis turning mechanism, a retroreflector for reflecting its reflected light to a direction parallel to the incident light, and a controller for driving the two-axis turning mechanism so as to track the retroreflector based on signals of the optical axis deviation detection sensor and the angle sensor, wherein the above-described problems are solved by detecting stop of the retroreflector and calculating a target distance from the turning center of the laser interferometer to the center of the retroreflector based on the total sum of deviation of an optical axis during movement, which is obtained by the optical axis deviation detection sensor, and a turning angle during movement, which is obtained by the angle sensor, when detecting the stop of the retroreflector.

The present invention also provides a tracking type laser interferometer including a laser interferometer, an optical axis deviation detection sensor for detecting a deviation of an optical axis of the laser interferometer, a two-axis turning mechanism for turning the laser interferometer to any optional direction, an angle sensor for detecting a turning angle of the two-axis turning mechanism, a retroreflector for reflecting its reflected light to a direction parallel to the incident light, and a controller for driving the two-axis turning mechanism so as to track the retroreflector based on signals of the optical axis deviation detection sensor and the angle sensor, and the same tracking type laser interferometer further includes means for detecting stop of the retroreflector based on signals of the optical axis deviation detection sensor and angle sensor, means for obtaining an angle corresponding to the stop from the values of the optical axis deviation detection sensor, and means for calculating a target distance from the turning center of the laser interferometer to the center of the retroreflector based on the total sum of deviation of an optical axis during movement, which is obtained by the optical axis deviation detection sensor when detecting the stop of the retroreflector, and a turning angle during movement, which is obtained by the angle sensor.

Here, when detecting stop of the retroreflector, calculation of the total sum of the deviation of an optical axis and calculation of a target distance may be collectively carried out.

Or, the turning angle may be calculated in every control cycle during movement of the retroreflector.

Or, the target distance L may be calculated by using the following expression:

$$\theta_t(t) = -(1/c) \cdot r \cdot \sin^{-1}(d/2L)$$

(where $\theta_t(t)$ is a turning angle of the two-axis turning mechanism, which is measured by the angle sensor, c is a constant determined by dynamic characteristics of the control system, and d is a deviation of an optical axis).

Further, the target distance L may be calculated by using the following expression:

$$L = (\theta_t'(t)/\theta_t(t))L_0$$

(where $L_0$ is a temporary target distance, and $\theta_t'(t)$ is a turning angle of the two-axis turning mechanism, which is obtained by giving the corresponding temporary target distance $L_0$).

Or, the target distance L may be made into the next time temporary target distance $L_0$.

According to the present invention, the estimation accuracy is not worsened even if the sensor for detecting a deviation of an optical axis is small-sized and the detection range is narrow, wherein highly accurate distance estimation is enabled. In addition, it is not necessary to waste time by interrupting measurement for distance estimation, and use convenience thereof is improved.

These and other novel features and advantages of the present invention will become apparent from the following detailed description of preferred embodiments.

BRIEF DESCRIPTION OF THE DRAWINGS

The preferred embodiments will be described with reference to the drawings, wherein like elements have been denoted throughout the figures with like reference numerals, and wherein.

DETAILED DESCRIPTION OF THE PREFERRED EMBODIMENTS

A detailed description will be given below of embodiments of the present invention with reference to the accompanying drawings.

Figure 6:
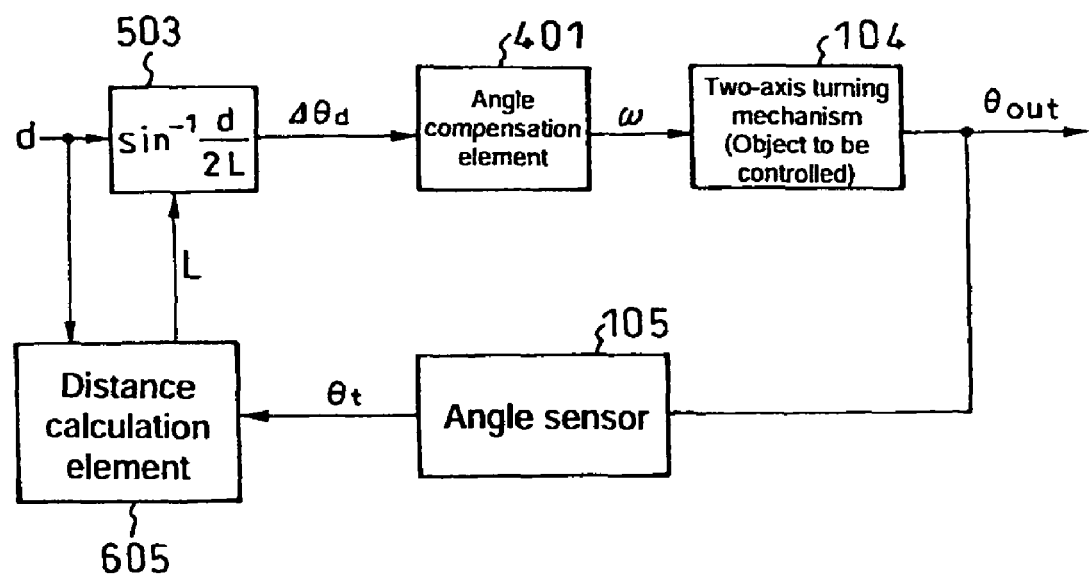
FIG. 6 is a block diagram showing an angle control system according to the present invention.

FIG. 6 is a block diagram showing a control system that carries out processing by the controller 108 used in Embodiment 1 of the present invention.

Figure 1:
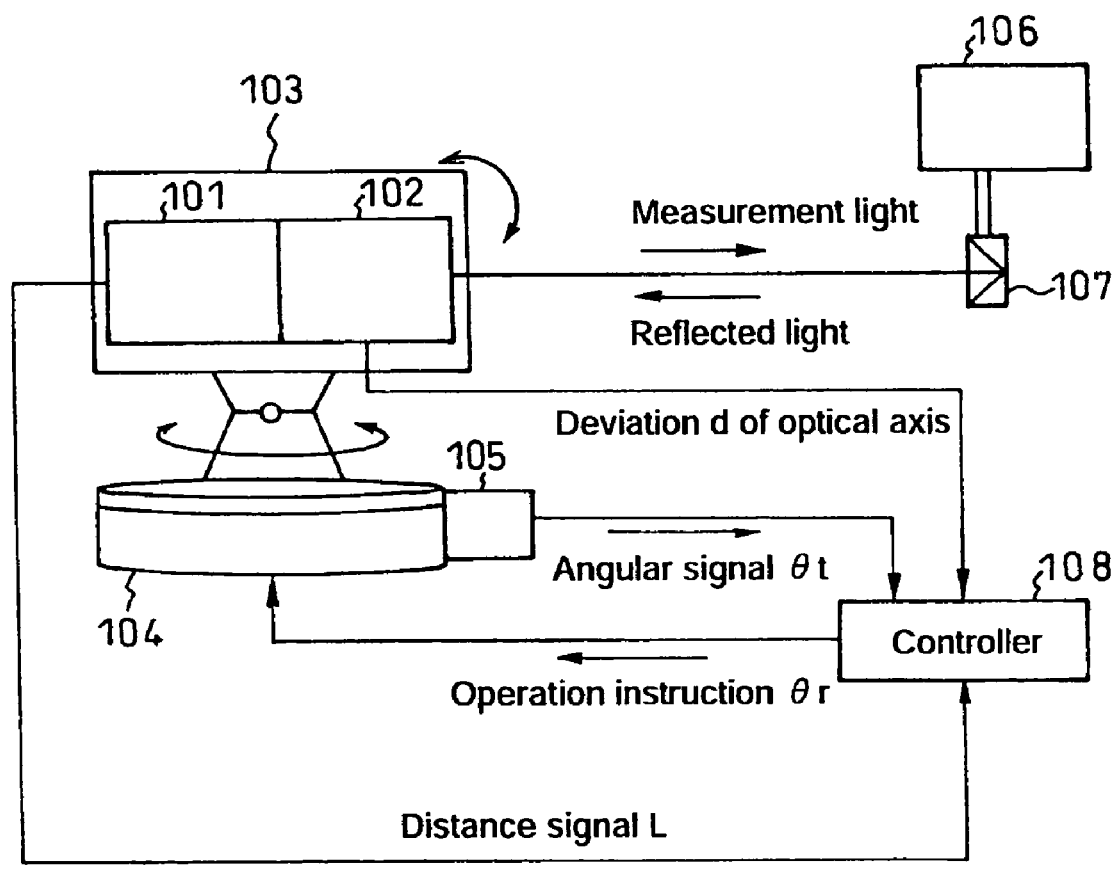
FIG. 1 is a view showing a generation configuration of a tracking type laser interferometer.
Figure 2:
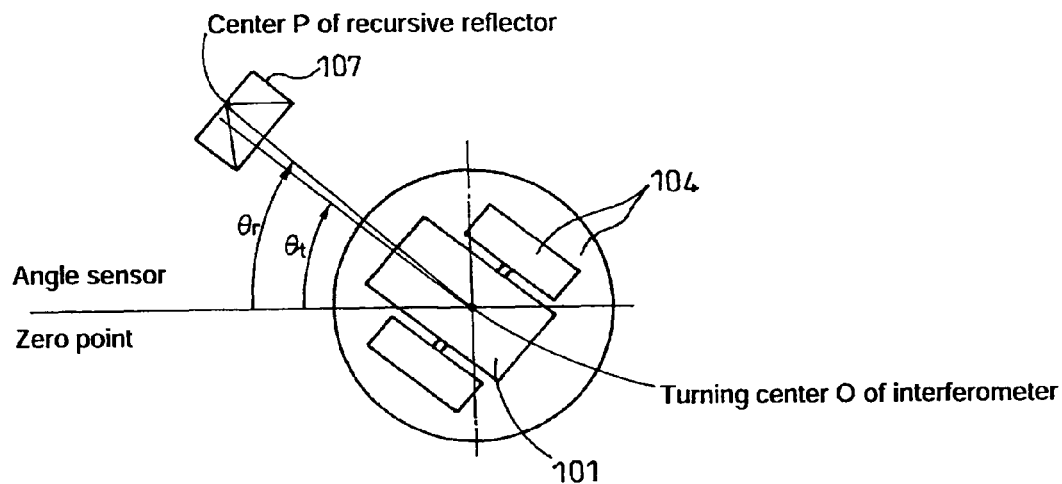
FIG. 2 is a plan view showing one example of the positional relationship between a laser interferometer and a retroreflector, which are under tracking.
Figure 3:
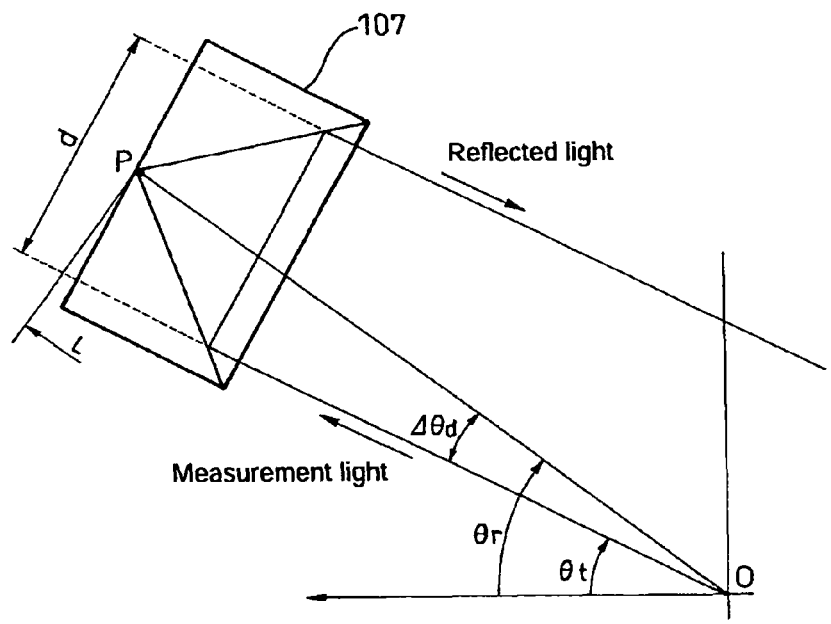
FIG. 3 is an enlarged plan view showing one example of the relationship between the turning center of the interferometer, center of the retroreflector and the deviation of an optical axis as well.
Figure 4:
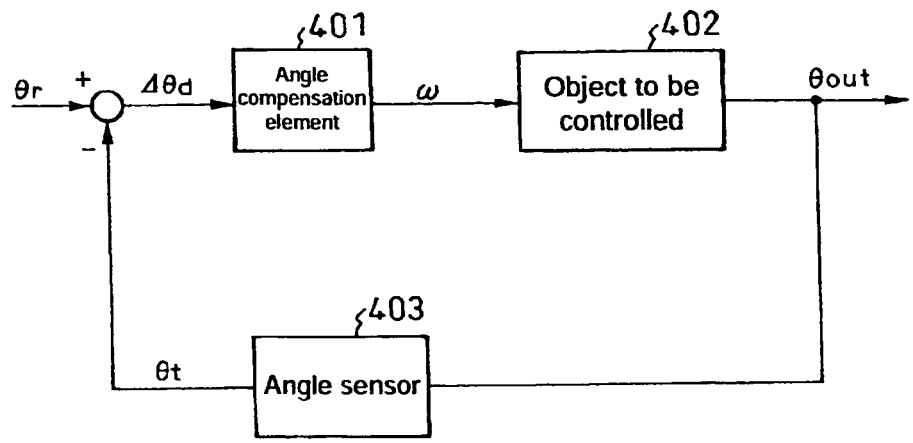
FIG. 4 is a block diagram of a general angle control system.
Figure 5:
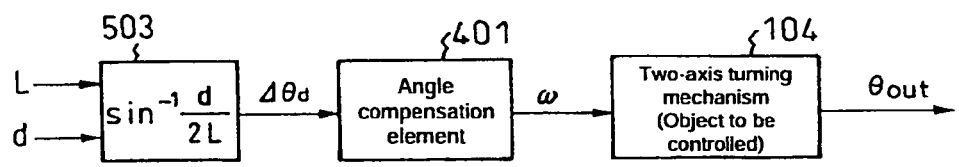
FIG. 5 is a block diagram showing a prior art tracking type laser interferometer.

The present embodiment is, as in the prior art shown in FIG. 5, such that an angle sensor 105 for detecting a turning angle $\theta_t$ of the two-axis turning mechanism 104 and a distance calculation element (distance estimation element) 605 for calculating the distance L between O and P (target distance) based on the angle $\theta_t$ measured by the corresponding angle sensor 105 and the deviation d of an optical axis are further added to a control system in which a velocity instruction value ω obtained by inputting $\Delta\theta_d$, which is obtained by calculating the distance L between O and P and the deviation d of an optical axis by means of the conversion element 503, in the angle compensation element 401 is input in the two-axis turning mechanism 104 being an object to be controlled.

The distance calculation element 605 outputs the distance L when the retroreflector 107 stops, by inputting the deviation d of an optical axis and the turning angle $\theta_t$ of the interferometer 101 in every control cycle.

Hereinafter, a detailed description will be given of a calculation method of the distance calculation element 605.

Where it is assumed that the acceleration time of the retroreflector 107 and the tracking type laser interferometer is sufficiently short, and the retroreflector 107 moves at a constant velocity ω, $\theta_r$ and $\theta_t$ may be expressed by the following expression.

$$\theta_r(t)=\omega \cdot t \quad (3)$$

$$\theta_t(t)=\omega \cdot t + \omega c \quad (4)$$

Here, c is a constant that is determined by dynamic characteristics of the control system of the tracking type laser interferometer.

Based on the expressions (3) and (4), the angular deviation $\Delta\theta_d$ may be expressed as below.

$$\Delta\theta_d = \theta_r - \theta_t = -\omega c \quad (5)$$

As shown in the following expression, a value obtained by integrating $\Delta\theta_d$ based on the expression (5) is assumed to be $\theta_d$.

$$\theta_d(t) = \int \Delta\theta_d(t) dt \quad (6)$$
$$= -c \cdot \omega \cdot \int dt$$
$$= -c \cdot \omega \cdot t$$

The following expression is established if $\theta_d$ is expressed by $\theta_r$.

$$\theta_d(t)=-c\theta_r(t) \quad (7)$$

$$\theta_r(t)=-1/c \cdot \theta_d(t) \quad (8)$$

Based on the expression (8), the turning angle $\theta_r$ of the retroreflector 107 may be expressed by using $\theta_d$. Also, since $\theta_r=\theta_t$ is established when the object 106 to be measured (Target) is stationary, $\theta_t$ may be expressed by using $\theta_d$ only when the target becomes stationary.

If $\theta_d$ is obtained by the expression (2), the following expression is established.

$$\theta_d(t)=\int \sin^{-1}(d/2L) dt \quad (9)$$

$$\theta_d(t)=t \cdot \sin^{-1}(d/2L) \quad (10)$$

By substituting $\theta_r=\theta_t$ and the expression (10) in the expression (8) and transforming the same, the following expression may be obtained.

$$\theta_t(t)=-(1/c) \cdot t \cdot \sin^{-1}(d/2L) \quad (11)$$

In a tracking type laser interferometer in which the acceleration time is sufficiently short and fixed deviation of an optical axis is brought about at a constant velocity, the expression (11) is established when the retroreflector is stationary. Therefore, the distance L between O and P is estimated based on the expression (11). The distance L is not clear. Therefore, if the turning angle $\theta_d$ obtained by giving a temporary target distance $L_0$ is assumed to be $\theta_d'$, the following expression is established based on the expressions (10) and (11).

$$\theta_d'(t)=\int \sin^{-1}(d/2L) \quad (12)$$

$$\theta_t'(t)=-(1/c) \cdot t \cdot \sin^{-1}(d/2L_0) \quad (13)$$

If the expressions (11) and (13) are expressed in terms of angular ratio, the relationship of the following expression is established.

$$\theta_t(t):\theta_t'(t)=-(1/c) \cdot t \cdot \sin^{-1}(d/2L):-(1/c) \cdot t \cdot \sin^{-1}(d/2L_0) \quad (14)$$

The following expression is established from the angular ratio.

$$-\theta_t(t) \cdot (1/c) \cdot t \cdot \sin^{-1}(d/2L_0)=-\theta_t'(t) \cdot (1/c) \cdot t \cdot \sin^{-1}(d/2L) \quad (15)$$

If the expression (15) is transformed where it is assumed that 2L and $2L_0$ are sufficiently large in regard to d, the following expression may be obtained.

$$\theta_t(t) \cdot (1/c) \cdot t \cdot (d/2L_0)=-\theta_t(t) \cdot (1/c) \cdot t \cdot (d/2L) \quad (16)$$

Therefore, the target distance L may be expressed by the following expression.

$$L=(\theta_t'(t)/\theta_t(t))L_0 \quad (17)$$

Next, a description will be given of a method for incorporating distance estimation of the expression (17) in the control system.

Figure 7:
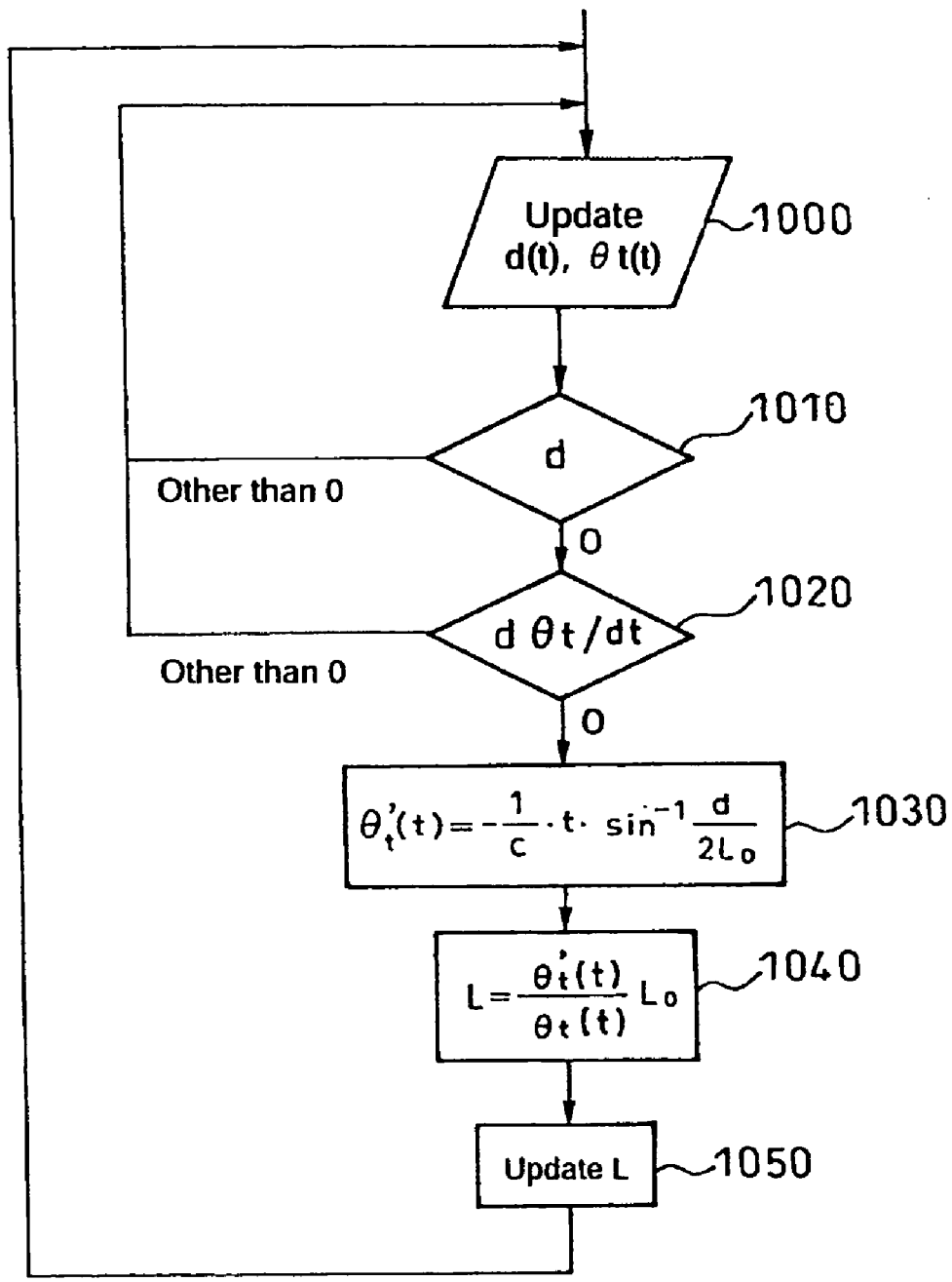
FIG. 7 is a flowchart showing a procedure of distance calculation according to Embodiment 1 of the present invention.

FIG. 7 summarizes internal processing of the distance calculation element 605 as a flowchart.

It is assumed that d, $\theta_t$ and L respectively are a deviation of an optical axis, output of the angle sensor 105, and an actual distance of an object to be measured, which are variables input in and output from the distance calculation element 605 in FIG. 6. $L_0$ is a distance of an object to be measured, which is temporarily determined for calculation, $\theta_t'$ is an angle value equivalent to $\theta_t$ that is obtained from d and $L_0$. Processing of the distance calculation element 605 consists of two factors of detection of stop and distance estimation of the object to be measured.

Calculation of the turning angle is carried out at all times (Step 1000), and integration calculation of deviation of an optical axis and distance estimation are carried out when detecting stop. With respect to detection of movement and stop of an object to be measured, stop of the measurement object is detected when the deviation d of an optical axis becomes zero (0) (Step 1010) and further the differential value of the turning angle $\theta_t$ of the interferometer 101 becomes zero (0) (Step 1020).

For distance calculation, the turning angle $\theta_t'$ is obtained from the deviation d of an optical axis using the expression (13) (Step 1030), and L is obtained from $\theta_r$, $\theta_t'$ and $L_0$ using the expression (17) (Step 1040).

Also, by substituting the obtained L into $L_0$, the estimation accuracy of the next time may be improved.

In the present embodiment, since integration calculation of the deviation of an optical axis and distance estimation are collectively carried out when detecting stop, load during movement is only slight.

Next, a description will be given of Embodiment 2 of the present invention.

Figure 8:
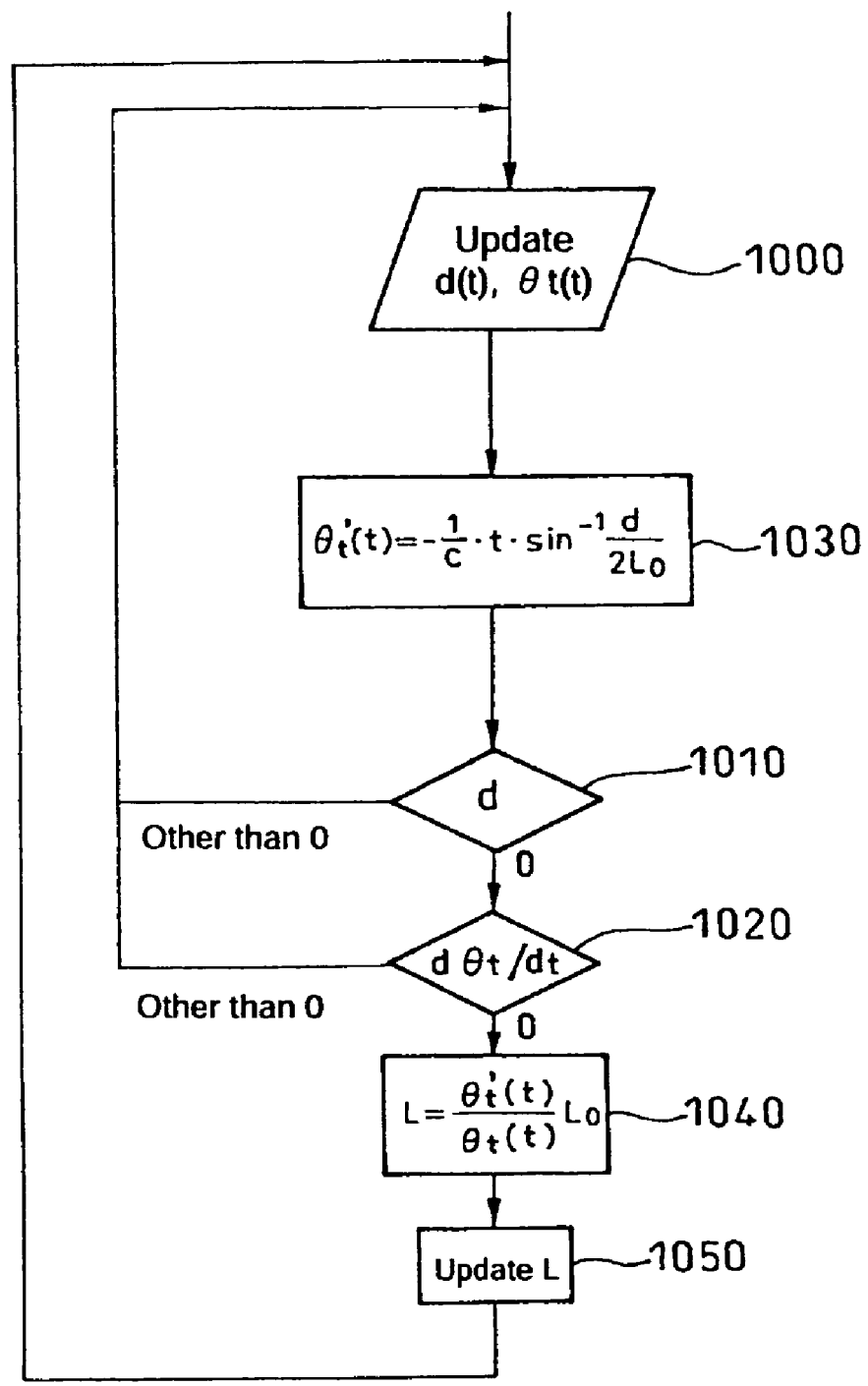
FIG. 8 is a flowchart showing a procedure of distance calculation according to Embodiment 2 of the present invention as well.

As shown in FIG. 8, the present embodiment is such that, in Embodiment 1, $\theta_t'$ is calculated from d and $L_0$ in every control cycle (Step 1030), and L is obtained (Step S1040) when being stationary (Steps 1010 and 1020).

In Embodiment 2, since the angle is calculated from the deviation of an optical axis at all times, the calculation process is reduced when being stationary.

It should be apparent to those skilled in the art that the above-described embodiments are merely illustrative which represent the application of the principles of the present invention. Numerous and varied other arrangements can be readily devised by those skilled in the art without departing from the spirit and the scope of the invention.

What is claimed is:

1. A method for estimating a distance between a tracking type laser interferometer and a target, the tracking type laser interferometer including:
   a laser interferometer,
   an optical axis deviation detection sensor for detecting a deviation of an optical axis of the laser interferometer,
   a two-axis turning mechanism for turning the laser interferometer to any optional direction,
   an angle sensor for detecting a turning angle of the two-axis turning mechanism,
   a retroreflector for reflecting its reflected light to a direction parallel to the incident light, and
   a controller for driving the two-axis turning mechanism so as to track the retroreflector based on signals of the optical axis deviation detection sensor and the angle sensor, comprising the steps of:
   detecting stop of the retroreflector, and
   calculating a target distance from the turning center of the laser interferometer to the center of the retroreflector based on the total sum of deviation of an optical axis during movement, which is obtained by the optical axis deviation detection sensor, and a turning angle during movement, which is obtained by the angle sensor, when detecting the stop of the retroreflector.

2. The method for estimating the distance between the tracking type laser interferometer and a target according to claim 1, wherein when detecting stop of the retroreflector, calculation of the total sum of deviation of an optical axis and calculation of the target distance are collectively carried out.

3. The method for estimating the distance between the tracking type laser interferometer and a target according to claim 1, wherein the turning angle is calculated in every control cycle during movement of the retroreflector.

4. The method for estimating the distance between the tracking type laser interferometer and a target according to claim 1, wherein the target distance L is calculated by using the following expression:

$$\theta_t(t) = -(1/c) \cdot t \cdot \sin^{-1}(d/2L)$$

(where $\theta_t(t)$ is a turning angle of the two-axis turning mechanism, which is measured by an angle sensor, c is a constant determined by dynamic characteristics of a control system, and d is a deviation of an optical axis).

5. The method for estimating the distance between the tracking type laser interferometer and a target according to claim 4, wherein the target distance L is calculated by using the following expression:

$$L = (\theta_t'(t)/\theta_t(t)) L_0$$

(where $L_0$ is a temporary target distance, and $\theta_t'(t)$ is a turning angle of the two-axis turning mechanism, which is obtained by giving the temporary target distance $L_0$).

6. The method for estimating the distance between the tracking type laser interferometer and a target according to claim 5, wherein the target distance L obtained in claim 5 is made into the next time temporary target distance $L_0$.

7. A tracking type laser interferometer including:
   a laser interferometer,
      an optical axis deviation detection sensor for detecting a deviation of an optical axis of the laser interferometer,
      a two-axis turning mechanism for turning the laser interferometer to any optional direction,
      an angle sensor for detecting a turning angle of the two-axis turning mechanism,
      a retroreflector for reflecting its reflected light to a direction parallel to the incident light, and
      a controller for driving the two-axis turning mechanism so as to track the retroreflector based on signals of the optical axis deviation detection sensor and the angle sensor; and
   the same tracking type laser interferometer further including:
   means for detecting stop of the retroreflector based on signals of the optical axis deviation detection sensor and angle sensor,
   means for obtaining an angle corresponding to the values of the optical axis deviation detection sensor, and
   means for calculating a target distance from the turning center of the laser interferometer to the center of the retroreflector based on the total sum of deviation of an optical axis during movement, which is obtained by the optical axis deviation detection sensor and a turning angle during movement, which is obtained by the angle sensor, when detecting the stop of the retroreflector.

8. The tracking type laser interferometer according to claim 7, wherein when detecting stop of the retroreflector, calculation of the total sum of deviation of an optical axis and calculation of a target distance are collectively carried out.

9. The tracking type laser interferometer according to claim 7, wherein the turning angle is calculated in every control cycle during movement of the retroreflector.

10. The tracking type laser interferometer according to claim 7, wherein the target distance L is calculated by using the following expression:

$$\theta_t(t) = -(1/c) \cdot t \cdot \sin^{-1}(d/2L)$$

(where $\theta_t(t)$ is a turning angle of the two-axis turning mechanism, which is measured by an angle sensor, c is a constant determined by dynamic characteristics of a control system, and d is a deviation of an optical axis).

11. The tracking type laser interferometer according to claim 10, wherein the target distance L is calculated by using the following expression:

$$L = (\theta_t'(t)/\theta_t(t)) L_0$$

(where $L_0$ is a temporary target distance, and $\theta_t'(t)$ is a turning angle of the two-axis turning mechanism, which is obtained by giving the temporary target distance $L_0$).

12. The tracking type laser interferometer according to claim 11, wherein the target distance L obtained in claim 11 is made into the next time temporary target distance $L_0$.

* * * * *